M. E. GRISWOLD.
VEHICLE AXLE.
APPLICATION FILED MAR. 14, 1917.

1,243,401.

Patented Oct. 16, 1917.

Inventor:
Marius E Griswold
By Davis & Davis
Attys

UNITED STATES PATENT OFFICE.

MARIUS E. GRISWOLD, OF CHICAGO, ILLINOIS.

VEHICLE-AXLE.

1,243,401. Specification of Letters Patent. Patented Oct. 16, 1917.

Application filed March 14, 1917. Serial No. 154,907.

*To all whom it may concern:*

Be it known that I, MARIUS E. GRISWOLD, a citizen of the United States, and a resident of the city of Chicago, county of Cook, and State of Illinois, have invented certain new and useful Improvements in Vehicle-Axles, of which the following is a specification.

This invention relates to improvements in vehicle axles designed for use especially in conjunction with juvenile vehicles, and has for its object the production of an axle which will be of simple and economical construction, one which will be light in weight and at the same time will possess great firmness and strength.

Other objects will appear hereinafter.

The invention consists in the combinations and arrangements of parts hereinafter described and claimed.

Figure 1:
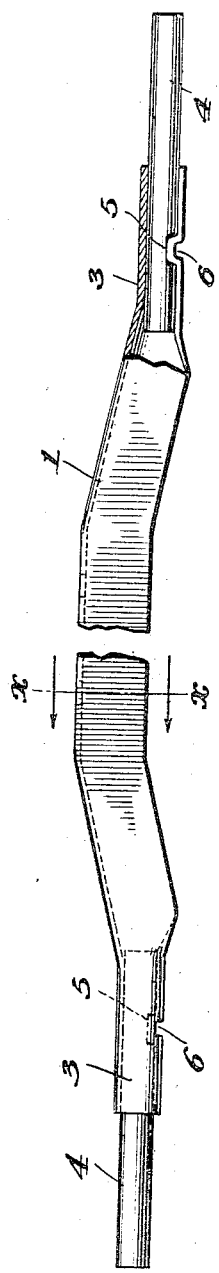
Figure 2:
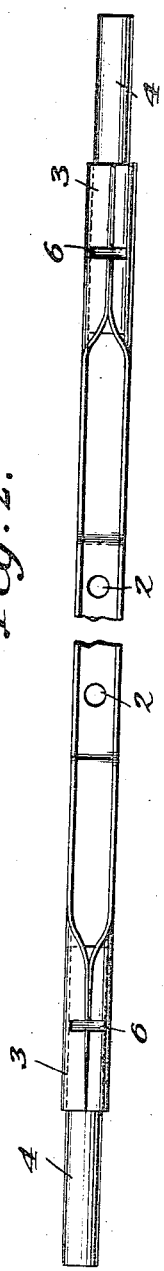
Figure 3:
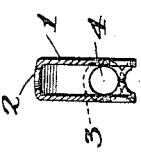

The invention will be best understood by reference to the accompanying drawing forming a part of this specification, and in which, Figure 1 is a partially sectional side elevation of a vehicle axle embodying the invention, Fig. 2 is a bottom plan view thereof, and Fig. 3 is a section taken on line x—x of Fig. 1.

The preferred form of construction, as illustrated in the drawing, comprises an axle consisting of a body 1 which is of channel form, the central portion of said body being arched upwardly, as shown. Formed in the upper side of the body 1, midway the ends thereof, are openings 2 for the reception of securing devices whereby the axle is attached to a turn plate or the body of the vehicle, as the case may be.

The ends 3 of the body 1 are tubularly formed for engagement with the inner end portions of spindles 4, these tubular portions being formed by curving the plate to bring the longitudinal seam or joint along the lower sides thereof. Said ends of said spindles fit snugly in the ends 3 of the axle body, and in order to lock said spindles rigidly in position, the same are formed at their under sides with transversely extending recesses 5. In the formation of the axle, after the insertion of the rearward ends of the spindles into the end portions 3, said end portions 3, at 6, are indented or pressed into engagement with the recesses 5, as clearly shown in the several views. The depressed portions 6 cross the seams in the portions 3, as clearly shown in Fig. 2, and thereby, in addition to serving as a means of rigidly locking the spindles in position, serve also as a means of holding the edges of the portions 3 at the seams thereof in operative position by stiffening the edges of the seams.

With the construction set forth, the body 1 may be formed of a metal of low grade, and the spindles 4, which receive the wear by engagement with the wheels which cooperate with the axle, may be formed of a better grade material. With this arrangement then, it will be seen that, a construction is produced which will be economical of manufacture since the spindles 4 which are formed of the expensive material constitute but a minor part of the body of the axle. By reason of the channel formation of the body 1, an axle possessing great strength and firmness is produced with the added advantage of lightness in weight and hence economy in material employed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

I particularly do not wish to limit my claims to a juvenile wagon axle as the invention may be embodied in large axles.

Having described my invention what I claim as new and desire to secure by Letters Patent is:

A vehicle axle comprising an elongated channel formed body having tubularly formed ends, these tubular ends having each a longitudinal seam or joint; spindles having their rearward ends fitting in and snugly embraced by said ends of said body; and means for locking said spindles in position in said ends of said body, said means comprising transversely extending recesses formed in the inner end portions of said spindles, said recesses registering with the seams in said ends of said body, the adjacent portion of each end of said body at either side of the seam thereof being bent inwardly into engagement with the corresponding recess, substantially as described.

In testimony whereof I have signed my name to this specification.

MARIUS E. GRISWOLD.

Copies of this patent may be obtained for five cents each, by addressing the "Commissioner of Patents, Washington, D. C."